United States Patent
Yang et al.

(10) Patent No.: US 8,299,395 B2
(45) Date of Patent: Oct. 30, 2012

(54) LASER MARKING MACHINE

(75) Inventors: Kuo-Chang Yang, Taipei Hsien (TW);
Song-Ya Chen, Shenzhen (CN);
Dong-Wei Zhao, Shenzhen (CN);
Qun-Fang Chen, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 256 days.

(21) Appl. No.: 12/912,774

(22) Filed: Oct. 27, 2010

(65) Prior Publication Data
US 2012/0080410 A1   Apr. 5, 2012

(30) Foreign Application Priority Data
Sep. 30, 2010   (CN) .......................... 2010 1 0298150

(51) Int. Cl.
*B23K 26/00*   (2006.01)
(52) U.S. Cl. ............... 219/121.68; 219/121.82
(58) Field of Classification Search ............ 219/121.68, 219/121.69, 121.82, 121.6
See application file for complete search history.

(56) References Cited

U.S. PATENT DOCUMENTS

| | | | | |
|---|---|---|---|---|
| 4,934,647 A | * | 6/1990 | Edwards ...................... | 248/371 |
| 4,934,671 A | * | 6/1990 | Laninga et al. ................ | 269/20 |
| 5,821,497 A | * | 10/1998 | Yamazaki et al. ....... | 219/121.69 |

FOREIGN PATENT DOCUMENTS

| | | | |
|---|---|---|---|
| JP | 07306212 | * | 11/1995 |
| SU | 723592 A | * | 3/1980 |

* cited by examiner

*Primary Examiner* — Samuel M Heinrich
(74) *Attorney, Agent, or Firm* — Altis Law Group, Inc.

(57) ABSTRACT

A laser marking machine includes a support portion, a laser marking device fixed on the support portion, a control chip and a fixing mechanism fixed on the support portion. The fixing mechanism includes a support board configured for supporting a workpiece, and four positioning blocks moved, and four motors being able to control the four positioning blocks to slide in the support board. The fixing mechanism further includes at least two position detectors. The two position detectors are able to position detector a distance data of the workpiece deviating from a center of the support board along X and Y axes, and transmit the distance data to the control chip. The control chip analyzes the distance data to control the four motors to respectively drive the four positioning blocks to slide in the support board until the workpiece is centered on the support board.

8 Claims, 4 Drawing Sheets

LASER MARKING MACHINE

BACKGROUND

1. Technical Field

The present disclosure relates to marking machines and, particularly, to a laser marking machine.

2. Description of Related Art

Laser marking machines often include a support portion for a workpiece and a laser marking device used for marking the workpiece. A laser marking device is often manually positioned prior to marking. Such a method of positioning is prone to error, and can result in lowered precision.

Therefore, what is needed is a laser marking machine to overcome the described limitations.

DETAILED DESCRIPTION

Figure 1:
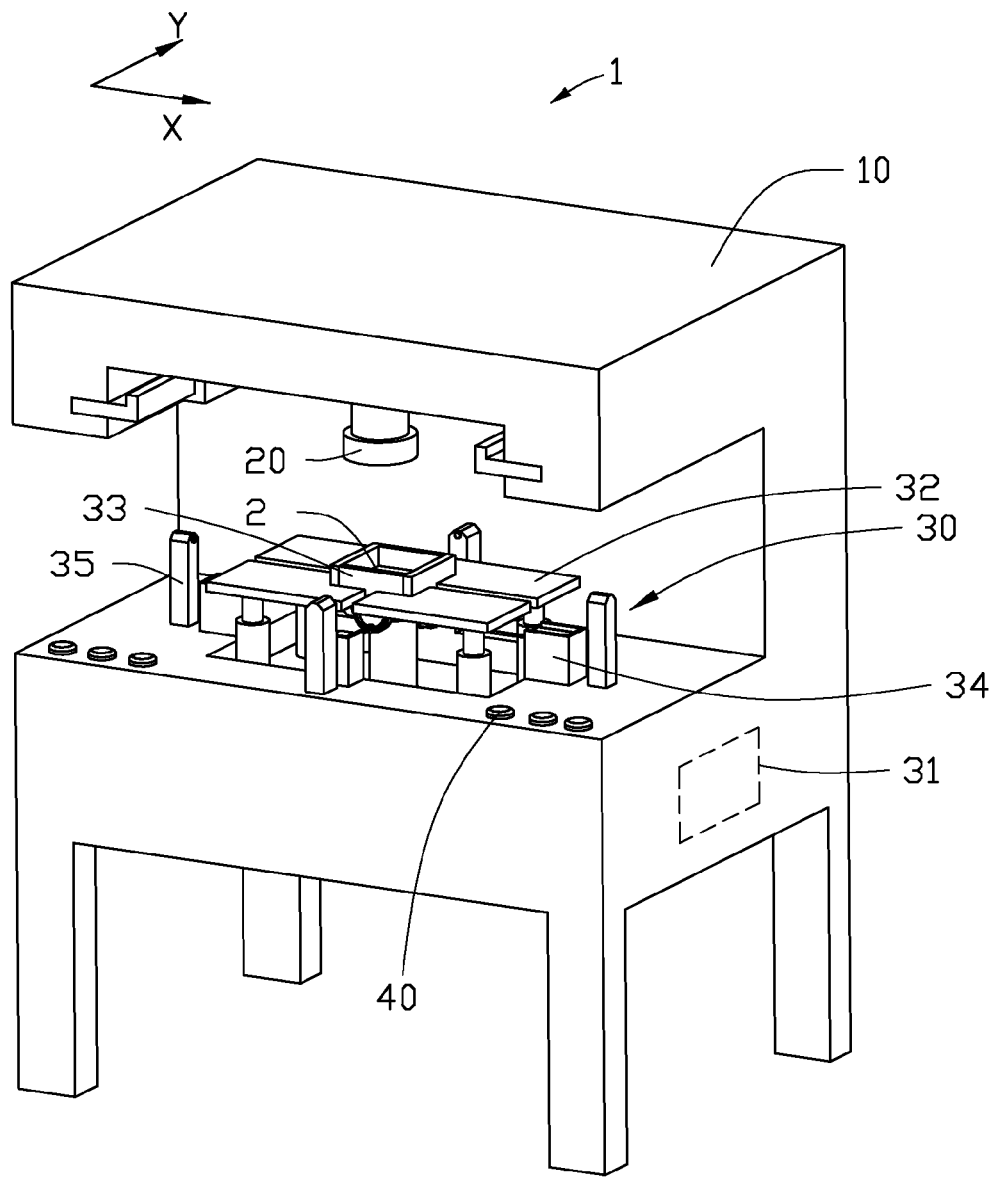
FIG. 1 is an isometric view of a laser marking machine in accordance with an exemplary embodiment.
Figure 2:
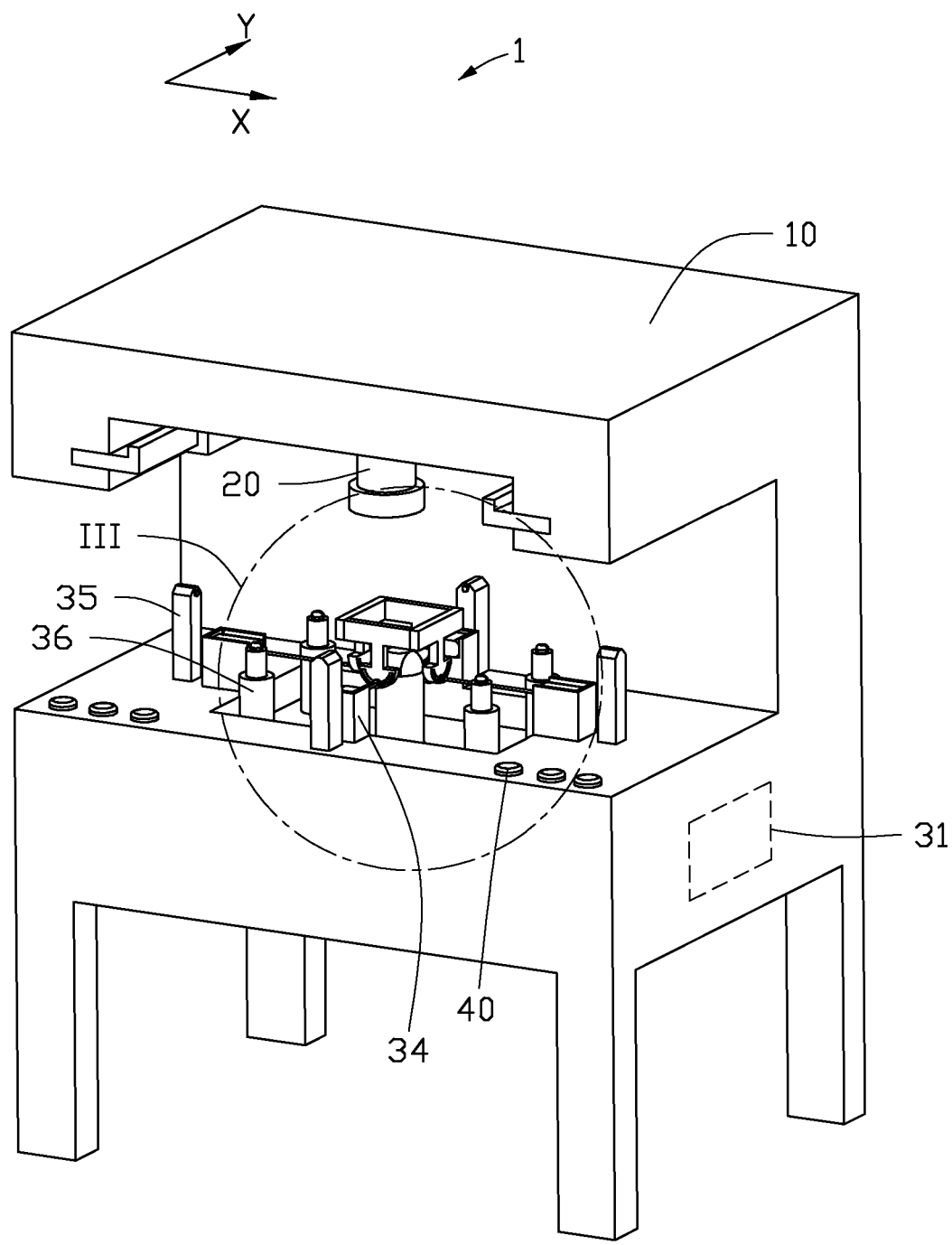
FIG. 2 is an isometric view of a laser marking machine of FIG. 1, with a support board omitted.
Figure 3:
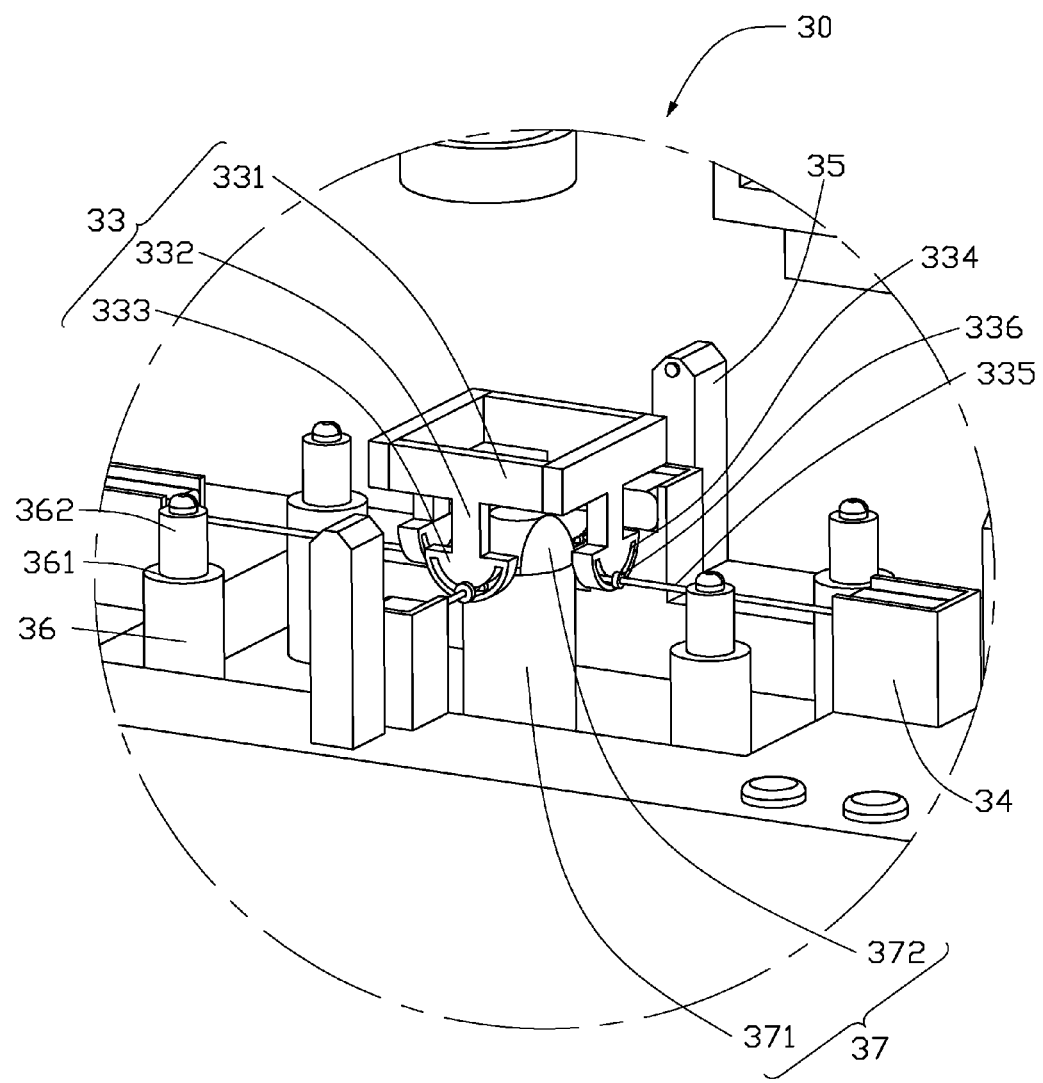
FIG. 3 is an enlarged view of a circled portion III of FIG. 2.

Referring to FIGS. 1-3, an embodiment of a laser marking machine 1 is illustrated. The laser marking machine 1 includes a support portion 10, a laser marking device 20 fixed to the support portion 10, a control chip 31, and a fixing mechanism 30 fixed on the support portion 10.

The fixing mechanism 30 includes a support board 32, four positioning blocks 33 slidably connected to the support board 32, four motors 34 and at least two position detectors 35. The support board 32 is configured for supporting a workpiece 2 among the four positioning blocks 33. The four motors 34 are respectively operable to provide a power supply for the four positioning blocks 33. The at least two position detectors 35 are respectively for measuring distance data of the workpiece 2 deviating from a center of the support board 32 along X and Y axes, and transmitting the distance data to the control chip 31. The control chip 31 is configured for analyzing the distance date to generate a result, and directing the four motors 34 to respectively drive the four positioning blocks 33 to move accordingly until the workpiece 2 is centered on the support board 32. The laser marking device 20 is operable to laser mark the workpiece 2 when centered on the support board 32. In order to better understand the disclosure, an exemplary embodiment is described in detail.

The fixing mechanism 30 further includes four support elements 36, each of which defines a receiving hole 361 on its top surface. The receiving hole 361 is configured for receiving a movable element 362. The movable element 362 can be driven up and down in the receiving hole 361 by the control chip 31. In one embodiment, the four support elements 36 may be air pressure ejectors controlled by the control chip 31 to drive the movable elements 362 up and down.

The support board 32 is placed on the four support elements 36. The support board 32 defines four slots 321 substantially perpendicular to each other along X and Y axes.

Each positioning block 33 includes a positioning portion 331, a connection portion 332, and a curved extending portion 333 extending from the connection portion 332 and away from the positioning portion 331. The connection portion 332 passes through the slot 321 to cause the positioning block 33 to be slidably connected to the support board 32. The extending portion 333 defines a curved perforation 334. Each positioning block 33 further includes a shaft 335 and two limitation elements 336. The shaft 335 passes through the perforation 334 and the two limitation elements 336 are arranged over the shaft 335 to limit the extending portion 333, thereby avoiding the extending portion 333 moving out of one end of the shaft 335. An opposite end of the shaft 335 is fixed to the motor 34.

Each motor 34 is operable to drive the extending portion 333 along the shaft 335 by the control chip 31, thereby driving the positioning portion 331 to slide along the slot 321 of the support board 32.

The at least two position detectors 35 are respectively aligned with two substantially perpendicular positioning portions 331. In one embodiment, four position detectors 35 are used, and may be infrared position detectors.

The fixing mechanism 30 further includes a rotation element 37. The rotation element 37 is placed below the support board 32, and includes a support 371 and a ball 372 placed on the support 371. The center of the support board 32 contacts the ball 372. The support board 32 is operable to rotate about the ball 372 by the four support elements 36.

When the workpiece 2 is placed on the support board 32 among the four positioning portions 331, the four position detectors 35 respectively detect the distance data of the workpiece 2 deviating from the center of the support board 32 along X and Y axes, and transmit the distance data to the control chip 31. The control chip 31 analyzes the distance data to generate a result, and directs the four motors 34 to drive the four extending portions 333 along the shaft 335 accordingly, thereby driving the four positioning portions 331 relative to each other in the support board 32 until the workpiece 2 is centered on the support board 32. After the workpiece 2 is centered on the support board 32, the laser marking device 20 can be operable to laser mark the workpiece 2.

Figure 4:
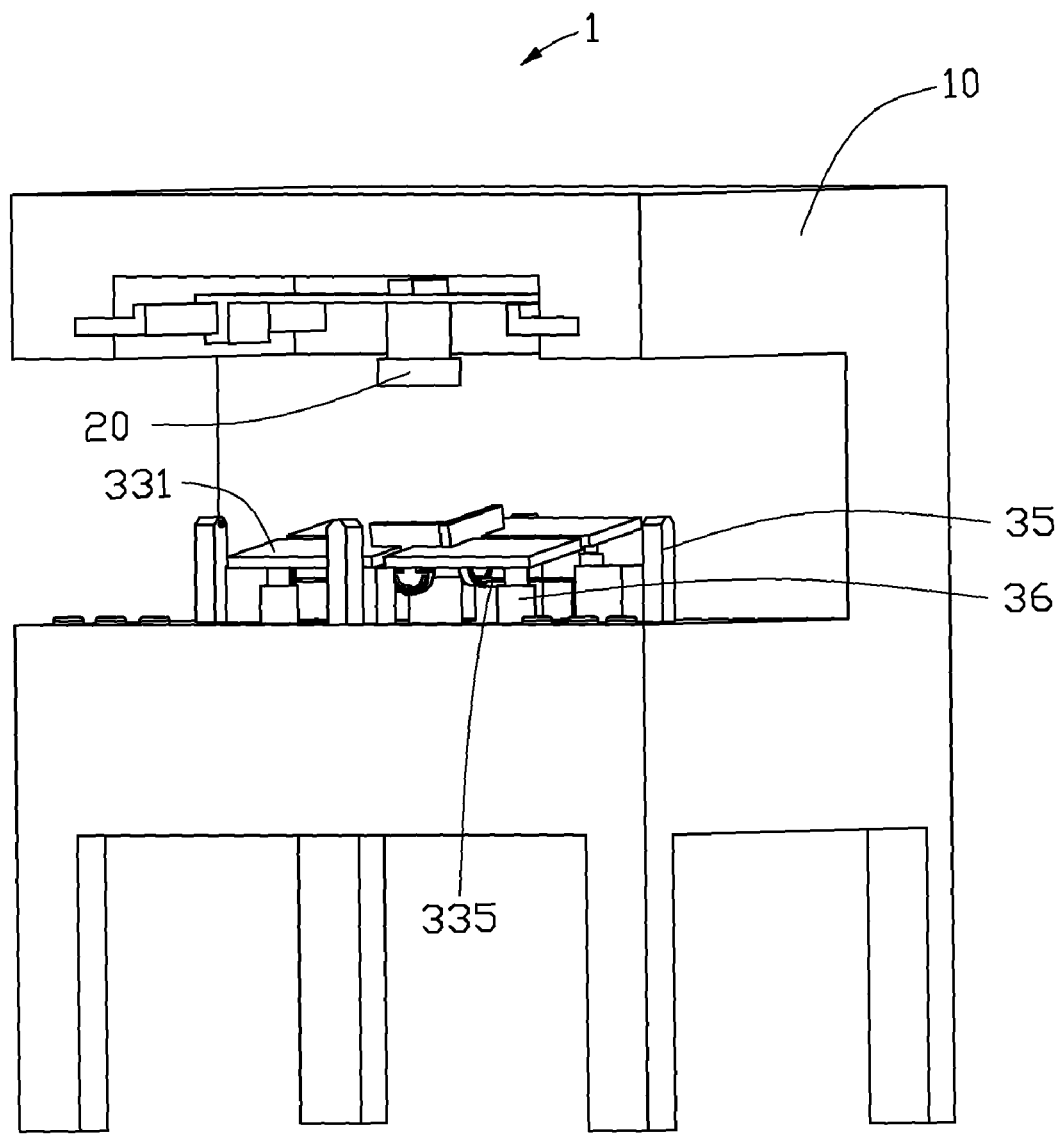
FIG. 4 shows the support board of the laser marking machine of FIG. 1 rotated to a predetermined angle.

Referring to FIG. 4, the fixing mechanism 30 further includes a number of input keys 40. When attempting to rotate the workpiece 2 to a predetermined angle, the workpiece 2 is firstly centered on the support board 32 according the above steps. Then, instructions input to the control chip 31 through the input key 40 instruct the control chip 31 to direct the four support elements 36 to move up and down in the receiving hole 361 in response to the instructions, thereby driving the workpiece 2 with the support board 32 to rotate about the ball 372 to the predetermined angle. During rotation of the workpiece 2, because the four positioning portions 331 are respectively slidably connected to the support board 32, the two shafts 335 respectively slide along the perforations 334 of the two extending portions 333, and another two extending portions 333 respectively move along the another two shafts 335.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A laser marking machine comprising:
   a support portion;
   a laser marking device fixed on the support portion;
   a control chip; and
   a fixing mechanism fixed on the support portion, and comprising:
   a support board configured for supporting an workpiece;
   four positioning blocks slidably connected to the support board;

four motors being able to control the four positioning blocks to slide in the support board; and at least two position detectors being able to measure distance data of the workpiece deviating from a center of the support board along X and Y axes, and transmit the distance data to the control chip;

wherein the control chip analyzes the distance data to generate a result, and directs the four motors to respectively drive the four positioning blocks to slide in the support board in response to the result until the workpiece is centered on the support board.

2. The laser marking machine as described in claim 1, wherein the at least two position detectors are infrared position detectors.

3. The laser marking machine as described in claim 2, wherein the number of the at least two position detector is four.

4. The laser marking machine as described in claim 1, wherein the support board defines four slots substantially perpendicular to each other, each of the four positioning blocks comprises a positioning portion, a connection portion and an extending portion extending from the connection portion and away from the positioning portion, the connection portion passes through the slot to cause the positioning block to be slidably connected to the support board.

5. The laser marking machine as described in claim 4, wherein each extending portion defines a curved perforation, each of the four positioning block further comprises a shaft and two limitation elements, one end of the shaft passes through the perforation, and cooperates with the two limitation elements to limit the extending portion to move along the shaft, and an opposite end is fixed to the motor.

6. The laser marking machine as described in claim 5, wherein the fixing mechanism further comprises four support elements, the support board is placed on the four support elements.

7. The laser marking machine as described in claim 6, wherein each support element defines a receiving hole on its top surface, the receiving hole is configured for receiving a movable element, the fixing mechanism further comprises a rotation element placed below the support board, the rotation element comprises a support and a ball placed on the support, the center of the support board contacts stay in the ball, the laser marking machine further comprises a plurality of input keys for receiving user input, the control chip directs the four movable elements to respectively move up and down in the receiving holes according the user input from the plurality of input keys, thereby driving the support board and the workpiece to rotate about the ball to a predetermined angle.

8. The laser marking machine as described in claim 7, wherein the four support elements are air pressure ejectors controlled by the control chip to drive the movable elements to move up and down.

\* \* \* \* \*